(12) United States Patent
Matsuo et al.

(10) Patent No.: US 9,435,448 B2
(45) Date of Patent: Sep. 6, 2016

(54) RELIEF VALVE

(75) Inventors: Masahiro Matsuo, Akashi (JP); Hirokazu Nasu, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 14/110,626

(22) PCT Filed: May 31, 2012

(86) PCT No.: PCT/JP2012/003574
§ 371 (c)(1),
(2), (4) Date: Oct. 8, 2013

(87) PCT Pub. No.: WO2012/169159
PCT Pub. Date: Dec. 13, 2012

(65) Prior Publication Data
US 2014/0069529 A1     Mar. 13, 2014

(30) Foreign Application Priority Data
Jun. 8, 2011   (JP) ................. 2011-128504

(51) Int. Cl.
*F16K 31/12*  (2006.01)
*F16K 17/04*  (2006.01)
*F16K 17/06*  (2006.01)

(52) U.S. Cl.
CPC ............. *F16K 17/04* (2013.01); *F16K 17/044* (2013.01); *F16K 17/065* (2013.01); *Y10T 137/7794* (2015.04)

(58) Field of Classification Search
CPC ...... F16K 17/044; F16K 17/04; F16K 17/08; F16K 17/082; Y10T 137/7794

USPC ......................... 137/514.3, 514.5, 514, 514.7
See application file for complete search history.

(56) References Cited

U.S. PATENT DOCUMENTS

| 2,742,054 A | * | 4/1956 | Poundstone | .................. 137/522 |
| 4,314,664 A | * | 2/1982 | Wisyanski | .................. 236/34.5 |
| 5,050,636 A | * | 9/1991 | Sagawa et al. | ............... 137/494 |

(Continued)

FOREIGN PATENT DOCUMENTS

| JP | Y2-63-19668 | 6/1988 |
| JP | A-05-346180 | 12/1993 |
| JP | A-11-351425 | 12/1999 |

OTHER PUBLICATIONS

Machine Translation of JP H05-346180 from EPO website Epo.org (on Nov. 2, 2014).*

(Continued)

*Primary Examiner* — Jessica Cahill
(74) *Attorney, Agent, or Firm* — Oliff PLC (57) ABSTRACT

A relief valve configured such that a plunger configured to be pushed forward by an elastic member to block communication between an inflow opening and an outflow opening moves rearward by an increase in pressure of the inflow opening against an elastic force of the elastic member to cause the inflow opening and the outflow opening to communicate with each other; and a piston configured to push a rear end of the elastic member forward moves forward by the increase in the pressure of the inflow opening to compress the elastic member, the elastic member includes a first elastic member and a second elastic member arranged in series, and the second elastic member has a smaller elastic constant than the first elastic member.

7 Claims, 7 Drawing Sheets

(56) References Cited

U.S. PATENT DOCUMENTS

| | | | |
|---|---|---|---|
| 6,142,176 A | 11/2000 | Sagawa et al. | |
| 7,069,723 B2 * | 7/2006 | Yamamoto et al. | 60/468 |
| 7,467,642 B2 * | 12/2008 | Prinsen et al. | 137/491 |
| 8,517,049 B2 * | 8/2013 | Mazzoni | 137/469 |
| 2007/0023722 A1 * | 2/2007 | Oishi | 251/129.15 |

OTHER PUBLICATIONS

International Search Report issued in International Application No. PCT/JP2012/003574 dated Sep. 4, 2012.

* cited by examiner

RELIEF VALVE

TECHNICAL FIELD

The present invention relates to a relief valve used for liquid-pressure control of a liquid-pressure circuit.

BACKGROUND ART

A liquid-pressure motor is typically used as a revolving motor or traveling motor for a revolving super structure of a construction machinery vehicle or the like, and is driven by a liquid-pressure circuit. A relief valve is used for liquid-pressure control of the liquid-pressure circuit.

Figure 6:
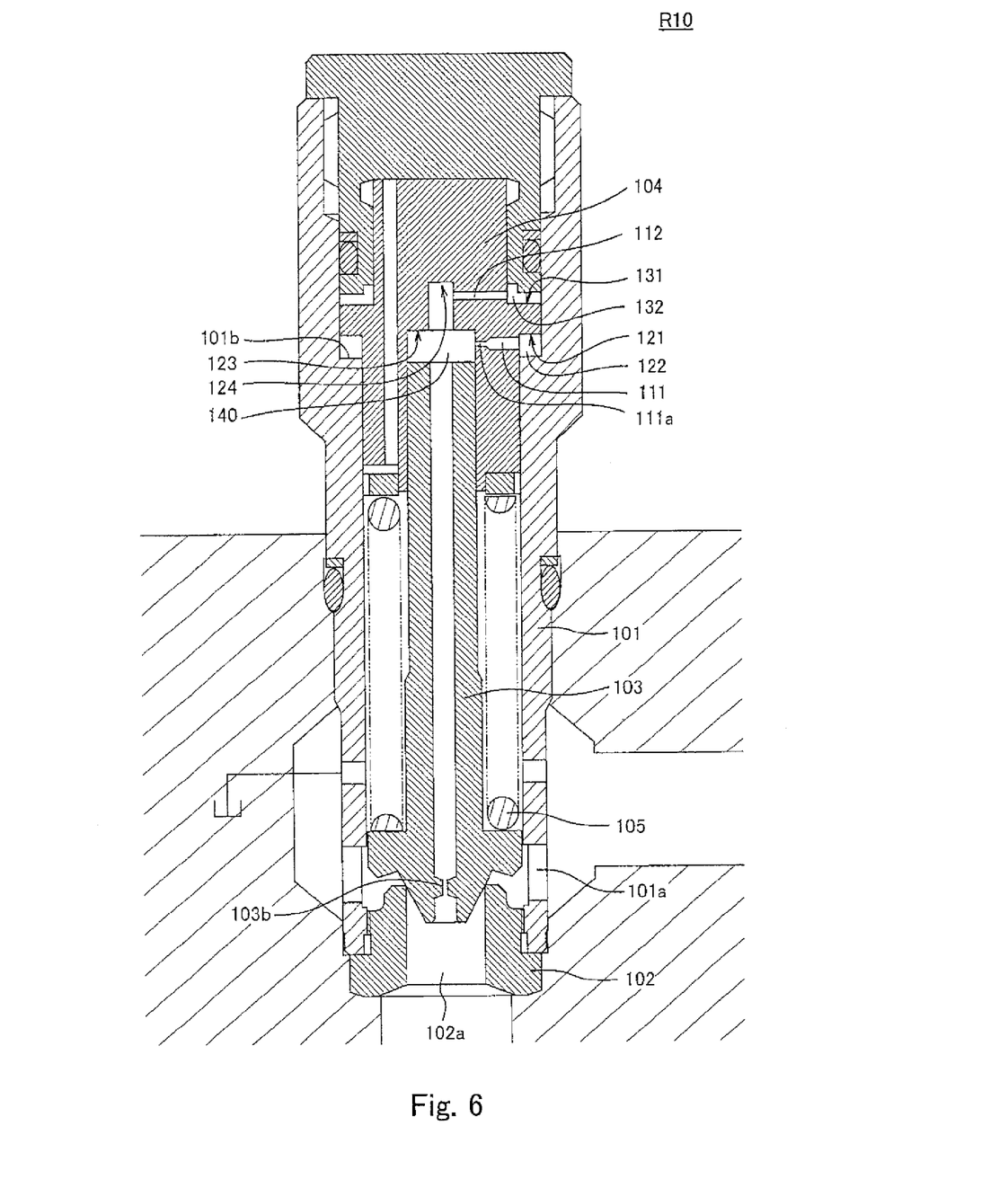
FIG. 6 is a longitudinal sectional view showing one example of conventional relief valves.

One example of conventional relief valves is shown in FIG. 6 (see PTL 1, for example). A relief valve R10 will be explained in reference to FIGS. 6 and 2. A dashed line in FIG. 2 shows that liquid pressure (relief pressure) of an inflow opening 102a of the relief valve R10 changes with time.

Figure 2:
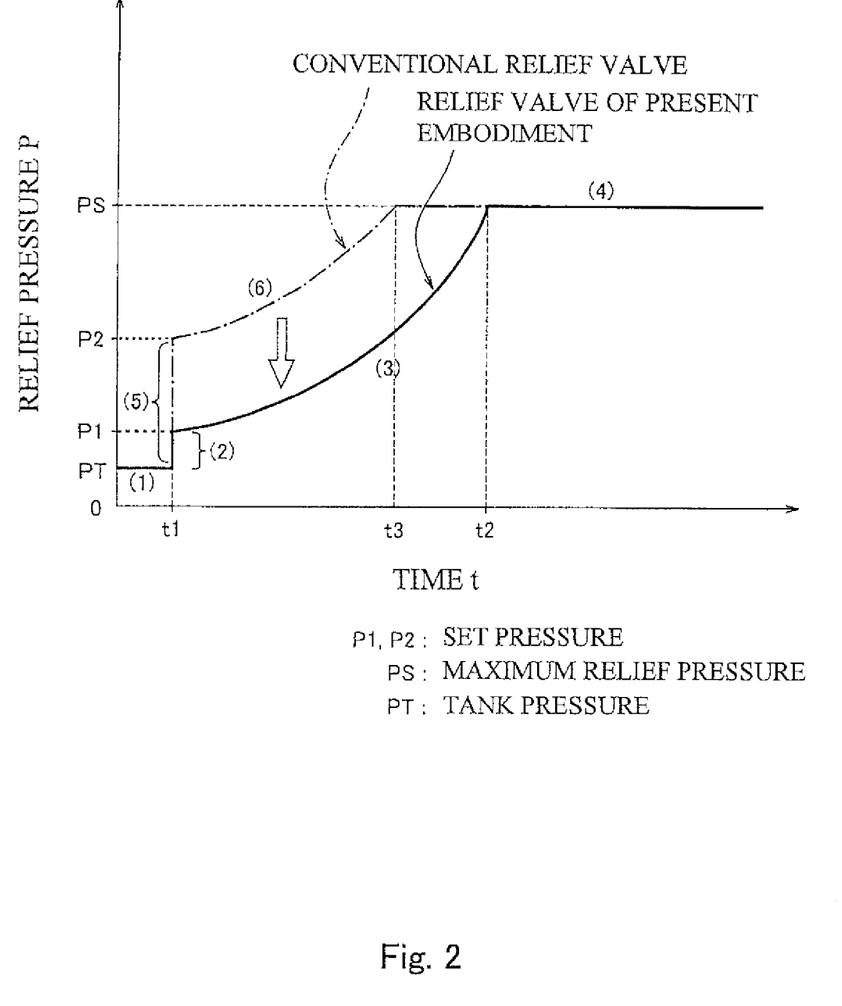
FIG. 2 is a diagram showing a change with time of relief pressure of, for example, the relief valve according to Embodiment 1 of the present invention.

Currently, the relief valve R10 is in a state shown in FIG. 6, and each of the pressure of the inflow opening 102a formed at a valve seat 102 and the pressure of an outflow opening 101a is tank pressure PT (state (1) shown in FIG. 2).

Next, for example, when the inflow opening 102a is rapidly pressurized (state (5) shown in FIG. 2), the liquid pressure of the inflow opening 102a is introduced to a third liquid chamber 140 through a restrictor 103b. Then, when the liquid pressure of the inflow opening 102a increases, and an upward force (rearward acting force) acting on a plunger 103 by the liquid pressure of the inflow opening 102a becomes higher than a downward force (forward acting force) acting on the plunger 103 by the liquid pressure of the third liquid chamber 140 and an elastic force (spring force) of a spring 105, the plunger 103 moves upward, that is, rearward, so that the inflow opening 102a and the outflow opening 101a communicate with each other. With this, a pressure liquid of the inflow opening 102a can be released through the outflow opening 101a at a predetermined flow rate from a state of initial set pressure P2.

Next, the liquid pressure of the third liquid chamber 140 is introduced to a first liquid chamber 122 and a second liquid chamber 132 through a communication hole 111 and restrictors 111a and 112 formed at the piston 104. Then, when the forward acting force applied to a forward acting surface 131 by the pressure liquid becomes higher than the total of a rearward acting force applied to bottom surfaces 123 and 124 of the third liquid chamber 140 and a rearward acting surface 121 by the pressure liquid and the elastic force of the spring 105, the piston 104 starts moving downward, that is, forward.

As above, when the piston 104 moves downward, that is, forward, the pressure liquid in the first liquid chamber 122 is discharged to the third liquid chamber 140 through the communication hole 111 and restrictor 111a of the piston 104. Therefore, the piston 104 slowly moves forward. Until the piston 104 moves forward as above to contact a step portion 101b of a case 101, the spring 105 is gradually compressed, and a repulsive force of the spring 105 gradually increases. Therefore, the relief pressure of the inflow opening 102a smoothly increases (state (6) shown in FIG. 2).

When the piston 104 moves forward to contact the step portion 101b of the case 101, the piston 104 cannot move downward, that is, forward any more. Therefore, the relief pressure is maintained at a constant maximum relief pressure PS (state (4) shown in FIG. 2). At the time of the states (6) and (4) shown in FIG. 2, the pressure liquid of the inflow opening 102a has pushed the relief valve open and is flowing out through the outflow opening 101a. Therefore, the pressure increase from the initial set pressure P2(t1) to the maximum relief pressure PS(t3) can be smoothly performed.

CITATION LIST

Patent Literature
PTL 1: Japanese Laid-Open Patent Application Publication No. 11-351425

SUMMARY OF INVENTION

Technical Problem

As shown in FIG. 2, the initial set pressure is set to P2 in the conventional relief valve R10 shown in FIG. 6. Therefore, until the liquid pressure of the inflow opening 102a reaches P2, the pressure liquid of the inflow opening 102a cannot be released to the outflow opening 101a at a predetermined flow rate. In this case, when a speed reduction operation of the revolving motor is started to stop the revolution of the revolving super structure of the construction machinery vehicle or the like using the relief valve R10, a rapid pressure change (torque change) may occur in the liquid-pressure circuit to which the revolving motor is connected, and a big impact may be applied to the liquid-pressure circuit, the revolving motor, and the revolving super structure.

Here, as a method of reducing the set pressure P2 of the relief valve R10 shown in FIG. 6, there is a method of reducing the spring constant of the spring 105 such that the force of pushing down the plunger 103 by the spring 105 becomes small in a state where the plunger 103 closes the inflow opening 102a.

However, in order to obtain the maximum relief pressure PS of FIG. 2 by using a spring having a small spring constant, a compression stroke (length) of the spring needs to be increased by increasing the length of the spring. In this case, the relief valve R10 increases in volume, and therefore, increases in size.

The present invention was made to solve the above problems, and an object of the present invention is to provide a relief valve that is compact and capable of in a case where liquid pressure of an inflow opening rapidly increases, releasing a pressure liquid of the inflow opening from a state where the liquid pressure is lower than those of conventional cases, and also capable of preventing a rapid pressure change (torque change) from occurring by smoothly increasing the liquid pressure of the inflow opening from a sate where the liquid pressure is low as above.

Solution to Problem

A relief valve according to the present invention is a relief valve configured to adjust relief pressure in such a manner that: a plunger configured to be pushed forward by an elastic unit to block communication between an inflow opening and an outflow opening moves rearward by an increase in pressure of the inflow opening against an elastic force of the elastic unit to cause the inflow opening and the outflow opening to communicate with each other; and a piston configured to push a rear end of the elastic unit forward moves forward by the increase in the pressure of the inflow opening to compress the elastic unit, wherein: the elastic unit includes a first elastic member and a second elastic member arranged in series; and the second elastic member has a smaller elastic constant than the first elastic member.

According to the relief valve of the present invention, in a case where the liquid pressure of the inflow opening rapidly increases, and a rearward acting force applied to the plunger by the liquid pressure in a rearward direction becomes higher than a forward acting force applied to the plunger by the elastic forces (for example, spring forces) of the first and second elastic members in a forward direction, the plunger moves rearward. Here, the distance of the rearward movement of the plunger corresponds to the total of compression lengths of the first and second elastic members. Since the elastic constant of the second elastic member is set to be smaller than the elastic constant of the first elastic member, the second elastic member is compressed more significantly than the first elastic member with the liquid pressure of the inflow opening comparatively low (with the set pressure comparatively low), and the plunger is caused to move rearward by a predetermined distance corresponding to the liquid pressure. Thus, the inflow opening and the outflow opening can be caused to communicate with each other. With this, the pressure liquid of the inflow opening can be released through the outflow opening Next, in a state where the plunger has moved rearward by a distance corresponding to the liquid pressure of the inflow opening, and the pressure liquid of the inflow opening is being released through the outflow opening, the piston configured to push forward the rear ends of the first and second elastic members arranged in series starts moving forward by the liquid pressure of the inflow opening. With this, the first and second elastic members can be gradually compressed, and the relief pressure can be smoothly increased. Thus, the liquid pressure of the inflow opening can be prevented from rapidly increasing.

Then, the pressure increase damping time until the liquid pressure (relief pressure) reaches the maximum relief pressure by the forward movement of the piston can be extended.

According to the relief valve of the present invention, by utilizing the elastic force of the first elastic member having the large elastic constant, a desired magnitude of maximum relief pressure can be set with respect to the relief valve.

The relief valve according to the present invention may be configured such that: a maximum relief pressure is mainly set by the first elastic member; and the relief pressure before the piston moves forward is mainly set by the second elastic member.

With this, the maximum relief pressure can be set mainly by the first elastic member, and pressure increase damping start pressure can be set mainly by the second elastic member.

The relief valve according to the present invention may be configured such that a stopper configured to stop the rearward movement of the plunger at a predetermined most rearward position is provided at a case in which the plunger is housed.

With this, when the second elastic member having the small elastic constant is compressed by the increase in the liquid pressure of the inflow opening, the rearward movement of the plunger can be stopped at the predetermined most rearward position. With this, a maximum opening degree of the relief valve can be set to a predetermined opening degree.

The relief valve according to the present invention may include a cup-shaped spring seat configured to restrict a compression length of the second elastic member such that the compression length of the second elastic member becomes equal to or smaller than a predetermined maximum compression length.

With this, when the plunger or the piston moves in such a direction that the first and second elastic members are compressed by the increase in the pressure of the inflow opening, the second elastic member is compressed more significantly than the first elastic member. In this case, when the compression length of the second elastic member becomes the predetermined maximum compression length, further compression of the second elastic member can be restricted by the cup-shaped spring seat. When the plunger or the piston further moves in such a direction that the first and second elastic members are compressed, the second elastic member is not compressed, but the first elastic member is compressed. Thus, the relief pressure can be maintained at the predetermined maximum relief pressure by the first elastic member.

The relief valve according to the present invention may be configured such that a ratio $K1/K2$ that is a ratio of an elastic constant $K1$ of the first elastic member to an elastic constant $K2$ of the second elastic member is from 5 to 20.

With this, for example, in a case where the relief valve of the present invention is adopted in a liquid-pressure circuit of a revolving motor for a revolving super structure of a construction machinery vehicle or the like, at the time of the speed reduction of the revolving motor, the rapid pressure change (torque change) of the liquid-pressure circuit can be effectively prevented from occurring. Thus, the big impact can be prevented from being applied to the liquid-pressure circuit, the revolving motor, and the revolving super structure, and the revolving motor can be reduced in speed with an appropriate negative acceleration to be stopped. To be specific, if the elastic constant ratio $K1/K2$ is lower than 5, the impact applied to the revolving super structure and the like may not be appropriately reduced. Then, if the elastic constant ratio $K1/K2$ exceeds 20, the length of the second elastic member needs to be increased in order to set predetermined set pressure, and this increases the volume and cost.

The relief valve according to the present invention may be configured such that: a liquid chamber in which the elastic unit is housed communicates with the outflow opening; the piston includes a first slide portion that liquid-tightly slides on an inner hole of a case; a rear portion of the plunger is slidably, fittingly inserted in a slide hole formed at the piston along a central axis of the piston; the plunger includes a through hole through which pressure liquid is introduced from the inflow opening to a rear side of the plunger; a third liquid chamber is formed by the through hole and a space which is located at a rear portion of the slide hole and to which the plunger does not reach; the piston includes a rearward acting surface and a forward acting surface located at a rear side of the first slide portion; the third liquid chamber and a first liquid chamber to which the rearward acting surface faces communicate with each other through a communication hole formed at the piston; the third liquid chamber and a second liquid chamber to which the forward acting surface faces communicate with each other through a communication hole formed at the piston; and the piston moves forward by a difference between a forward acting force applied to the forward acting surface by the pressure liquid and a rearward acting force applied by the pressure liquid to a bottom surface of the slide hole of the piston and the rearward acting surface.

With this, the difference between the area of the forward acting surface and the total of the area of the bottom surface of the slide hole of the piston and the area of the rearward acting surface becomes the effective pressure receiving area of the piston. On this account, for example, independently of the thickness of the first slide portion of the piston, the effective pressure receiving area for causing the piston to move forward can be set. Thus, the piston having predetermined stiffness can be manufactured.

The relief valve according to the present invention may be configured such that: an area of the forward acting surface is larger than a total of an area of the bottom surface of the slide hole and an area of the rearward acting surface; and the difference between the forward acting force and the rearward acting force is generated by a difference between the area of the forward acting surface and the total of the area of the bottom surface of the slide hole and the area of the rearward acting surface.

With this, by reducing the effective pressure receiving area for causing the piston to move forward, the piston slowly moves forward. Thus, the pressure increase damping time can be extended. By increasing the effective pressure receiving area, the piston quickly moves forward. Thus, the pressure increase damping time can be shortened. As above, the pressure increase damping time can be set freely.

The relief valve according to the present invention may be configured such that: a pressure difference is generated between front and rear sides of each of the communication holes by the difference between the forward acting force and the rearward acting force; and the piston moves forward while the pressure liquid flows through the communication holes.

With this, by thinly forming the communication hole, the piston slowly moves forward. Thus, the pressure increase damping time can be extended. By thickly forming the communication hole, the piston quickly moves forward. Thus, the pressure increase damping time can be shortened. As above, the pressure increase damping time can be set freely.

Advantageous Effects of Invention

The relief valve according to the present invention is configured such that the first and second elastic members that are different in the elastic constant from each other are arranged in series. Therefore, the pressure increase damping start pressure can be reduced. In addition, in a case where the liquid pressure of the inflow opening rapidly increases, the pressure liquid of the inflow opening can be released through the outflow opening from a state where the liquid pressure is comparatively low. With this, in a case where the relief valve of the present invention is adopted in a liquid-pressure circuit of a revolving motor for a revolving super structure of a construction machinery vehicle or the like, at the time of the start of the speed reduction of the revolving motor, the rapid pressure change (torque change) of the liquid-pressure circuit can be prevented from occurring. Thus, the big impact can be prevented from being applied to the liquid-pressure circuit, the revolving motor, and the revolving super structure.

Since the liquid pressure of the inflow opening can be released to the outflow opening from a state where the liquid pressure is comparatively low, the pressure increase damping time until the relief pressure of the inflow opening reaches the maximum relief pressure can be extended. With this, the revolving motor can be appropriately, slowly stopped such that the big impact is not applied to the liquid-pressure circuit, the revolving motor, and the revolving super structure.

The second elastic member having the small elastic constant is adopted to reduce the pressure increase damping start pressure, and the first elastic member having the large elastic constant is adopted to maintain the relief pressure at the predetermined maximum relief pressure. With this, the volume of the relief valve can be made smaller than that of a valve configured to act in the same manner as above and using one elastic member, such as a spring.

DESCRIPTION OF EMBODIMENTS

Hereinafter, Embodiment 1 of a relief valve according to the present invention will be explained in reference to FIGS. 1 to 4. According to a relief valve R1 shown in FIG. 1, when a speed reduction operation of a revolving motor is started to stop the revolution of a revolving super structure of, for example, a construction machinery vehicle using the relief valve R1, a rapid pressure change can be prevented from occurring in a liquid-pressure circuit to which the revolving motor is connected, and the revolution of the revolving super structure can be stopped such that a big impact is prevented from being applied to the liquid-pressure circuit, the revolving motor, and the revolving super structure.

Figure 1:
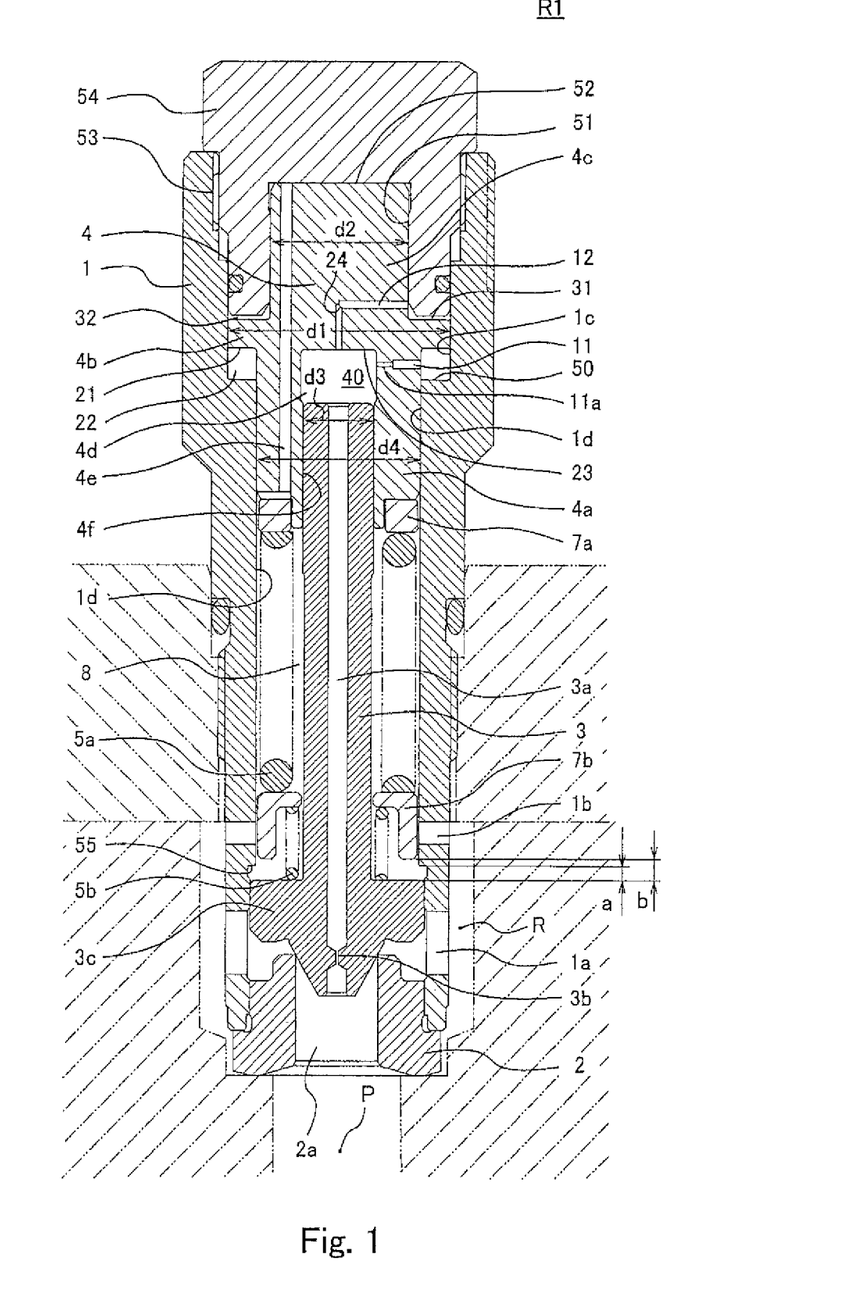
FIG. 1 is a longitudinal sectional view showing a relief valve according to Embodiment 1 of the present invention.

As shown in a longitudinal sectional view of FIG. 1, the relief valve R1 includes: a substantially cylindrical outer case 1; an inner case 54 that is threadedly engaged with the outer case 1; a valve seat 2 provided so as to be fixed to a tip end portion (front side portion) of the outer case 1; a plunger 3 arranged in the outer case 1; a piston 4 arranged in the inner case 54; and a first elastic member 5a and a second elastic member 5b, each of which is a coil-shaped compression spring (elastic unit) interposed between the plunger 3 and the piston 4.

A force (for example, set pressure) of compressing the first and second elastic members 5a and 5b can be adjusted by changing the thickness of a spring seat 7a.

Regarding an inner hole of the outer case 1, the inner diameter of a portion 1c to which a large-diameter portion (second slide portion 4b) of the piston 4 is attached is d1, and the inner diameter of a portion 1d to which a medium-diameter portion (first slide portion 4a), located at a front side of the large-diameter portion, of the piston 4 is attached is d4. An outflow opening 1a and a passage 1b communicating with the outflow opening are formed on a side surface of the outer case 1. The valve seat 2 is a circular member, and a pressure liquid inflow opening 2a is formed at a center portion of the valve seat 2. The plunger 3 includes a tip end portion having a tapered shape, that is, a substantially truncated cone shape. A through hole 3a is formed at the center of the plunger 3.

The through hole 3a is formed so as to penetrate the plunger 3 from a tip end of the plunger 3 to a rear end thereof and introduce the pressure liquid from the inflow opening 2a to a rear side of the plunger 3. A restrictor 3b is formed at a portion of the through hole 3a. The restrictor 3b is formed so as to give a damping force to the operation of the plunger 3 to prevent hunting.

The first slide portion 4a that is the medium-diameter portion having the outer diameter d4 is formed at a front portion of the piston 4, and the second slide portion 4b that is the large-diameter portion having the outer diameter d1 is formed at a rear side of the first slide portion 4a. Further, a third slide portion 4c that is a small-diameter portion is formed at a rear end portion of the piston 4. A recess 51 that opens in a front direction along a central axis is formed at the inner case 54.

The third slide portion 4c is fittingly inserted in the recess 51 of the inner case 54 so as to slide liquid-tightly, and a liquid chamber 52 is formed between the rear end portion of the third slide portion 4c and the recess 51. Then, the first slide portion 4a is fittingly inserted in the portion, having the inner diameter d4, of the inner hole 1d of the outer case 1 so as to be slidable liquid-tightly, and the second slide portion 4b is fittingly inserted in the portion of the inner hole 1c of the outer case 1 so as to be slidable liquid-tightly. An outer diameter of the third slide portion 4c is d2.

A slide hole 4f that opens at a front surface of the piston 4 is formed at the piston 4 along a central axis thereof. An inner diameter of the slide hole 4f is d3. A rear portion of the plunger 3 is fittingly inserted in the slide hole 4f so as to be slidabe. A rear space 4d of the slide hole 4f and the through hole 3a of the plunger 3 constitute a third liquid chamber 40. The rear space 4d of the slide hole 4f is formed such that even if the plunger 3 slides to a rearmost position of a slidable range of the plunger 3, the rear end of the plunger 3 does not reach the rear space 4d of the slide hole 4f. The piston 4 includes a passage 4e configured to penetrate the first slide portion 4a, the second slide portion 4b, and the third slide portion 4c in an axial direction and cause a spring chamber 8 in which the first and second elastic members 5a and 5b are housed and the liquid chamber 52 to communicate with each other.

The piston 4 includes communication holes 11 and 12. A restrictor 11a is formed at a portion of the communication hole 11. The communication hole 12 does not include a restrictor. A front end surface of the large-diameter portion (second slide portion 4b) serves as a rearward acting surface 21 on which the pressure liquid acts, and a first liquid chamber 22 to which the rearward acting surface 21 faces communicates with the third liquid chamber 40 through the communication hole 11. A rear end surface of the large-diameter portion (second slide portion 4b) serves as a forward acting surface 31 on which the pressure liquid acts, and a second liquid chamber 32 to which the forward acting surface 31 faces communicates with the third liquid chamber 40 through the communication hole 12.

The first elastic member 5a and the second elastic member 5b are housed in the spring chamber 8 (fifth liquid chamber) so as to be arranged in series. The spring chamber 8 (fifth liquid chamber) is formed between an inner peripheral surface 1d of the outer case 1 and an outer peripheral surface of the plunger 3. The first elastic member 5a is arranged in a compressed state such that a tip end thereof contacts a rear end of the second elastic member 5b via a cup-shaped spring seat 7b, and a rear end thereof presses a front end surface of the first slide portion 4a of the piston 4 rearward via the spring seat 7a. The second elastic member 5b is arranged in a compressed state such that a tip end thereof presses a large portion 3c of the plunger 3 forward from behind, and a rear end thereof presses the cup-shaped spring seat 7b rearward.

An elastic constant K2 of the second elastic member 5b is set to be smaller than an elastic constant K1 of the first elastic member 5a. An elastic constant ratio K1/K2 is, for example, from 5 to 20, and preferably from 5 to 15.

For reference, if the elastic constant ratio K1/K2 is smaller than 5, the impact applied to the revolving super structure and the like may not be appropriately reduced. Then, if the elastic constant ratio K1/K2 exceeds 20, the length of the second elastic member 5b needs to be increased in order to set predetermined set pressure P1, and this increases the volume and cost.

Then, a stopper 55 configured to stop a rearward movement of the plunger 3 at a predetermined most rearward position is formed at an inner peripheral surface of a tip end portion of the outer case 1. The stopper 55 is formed by an annular-shaped step portion projecting toward an inner side of the outer case 1. The rearward movement of the plunger 3 can be stopped at the predetermined most rearward position by causing the large portion 3c of the plunger 3 to contact the stopper 55.

By forming the stopper 55 as above, the rearward movement of the plunger 3 can be stopped at the predetermined most rearward position when the second elastic member 5b having the small elastic constant is compressed by an increase in the liquid pressure of the inflow opening 2a. With this, a maximum opening degree of the relief valve R1 can be set to a predetermined opening degree. It should be noted that "a" shown in FIG. 1 denotes a stroke of the plunger 3 that can move forward and backward.

The cup-shaped spring seat 7b can restrict a maximum compression length b of the second elastic member 5b.

To be specific, when the plunger 3 or the piston 4 moves in such a direction that the first and second elastic members 5a and 5b are compressed by the increase in the pressure of the inflow opening 2a, the second elastic member 5b is compressed more significantly than the first elastic member 5a. In this case, when the compression length of the second elastic member 5b becomes the predetermined maximum compression length b, a rear end surface of the large portion 3c of the plunger 3 and a front surface of a cylindrical portion of the spring seat 7b contact each other. Thus, further compression of the second elastic member 5b can be restricted. When the piston 4 further moves in such a direction that the first and second elastic members 5a and 5b are compressed, the second elastic member 5b is not compressed, but the first elastic member 5a is compressed. Thus, the set pressure increases. When the front surface (rearward acting surface) 21 of the second slide portion 4b of the piston 4 contacts a step portion 50 of the inner hole 1c, the first elastic member 5a is not compressed any more, and the set pressure becomes maximum. Therefore, the relief pressure can be maintained at the predetermined maximum relief pressure PS.

Next, the actions of the relief valve R1 configured as shown in FIG. 1 will be explained in reference to FIGS. 1 and 2. A solid line shown in FIG. 2 denotes a state where the liquid pressure (relief pressure) of the inflow opening 2a of the relief valve R1 changes with time.

Currently, the relief valve R1 is in a state shown in FIG. 1, and each of the pressure of the inflow opening 2a and the pressure of the outflow opening 1a is tank pressure PT (state (1) shown in FIG. 2).

Next, for example, when the inflow opening 2a is rapidly pressurized (state (2) shown in FIG. 2), the liquid pressure of the inflow opening 2a is introduced to the third liquid chamber 40 through the restrictor 3b. Then, when an upward force (rearward acting force) acting on the plunger 3 by the increased liquid pressure of the inflow opening 2a becomes higher than a downward force (forward acting force) acting on the plunger 3 by the liquid pressure of the third liquid chamber 40 and the elastic forces (spring forces) of the first and second elastic members 5a and 5b, the plunger 3 moves upward, that is, rearward. Then, the valve opens, and the pressure liquid flows out to the outflow opening 1a (relief pressure P1).

Here, the distance of the rearward movement of the plunger 3 corresponds to the total of the compression lengths of the first and second elastic members 5a and 5b. Since the elastic constant K2 of the second elastic member 5b is set to be smaller than the elastic constant K1 of the first elastic member 5a, the second elastic member 5b is compressed more significantly than the first elastic member 5a with the liquid pressure of the inflow opening 2a comparatively low, and the plunger 3 is caused to move rearward by a predetermined distance corresponding to the liquid pressure (the opening becomes substantially maximum). Thus, the inflow opening 2a and the outflow opening 1a can be caused to communicate with each other. With this, the pressure liquid of the inflow opening 2a can be released through the outflow opening 1a.

Next, in a state where the plunger 3 has moved rearward by the distance corresponding to the liquid pressure of the inflow opening 2a (the opening has become substantially maximum), and the pressure liquid of the inflow opening 2a is being released through the outflow opening 1a, the liquid pressure of the third liquid chamber 40 is introduced to the first liquid chamber 22 and the second liquid chamber 32 through the restrictor 11a and communication holes 11 and 12 of the piston 4. Then, when the forward acting force applied to the forward acting surface 31 by the pressure liquid becomes higher than the total of the rearward acting force applied to a bottom surface 23 of the third liquid chamber 40 and the rearward acting surface 21 by the pressure liquid and the elastic forces of the first elastic member 5a and the second elastic member 5b, the piston 4 starts moving downward, that is, forward.

As above, when the piston 4 moves downward, that is, forward, the pressure liquid in the first liquid chamber 22 is discharged to the third liquid chamber 40 through the communication hole 11 and restrictor 11a of the piston 4. Therefore, the piston 4 slowly moves forward. By this slow forward movement of the piston 4, the first and second elastic members 5a and 5b can be gradually compressed, and the relief pressure P can be increased smoothly (state (3) shown in FIG. 2).

As above, from a state where the liquid pressure of the inflow opening 2a is the comparatively low liquid pressure (P1), the piston 4 slowly moves forward, and the liquid pressure of the inflow opening 2a starts increasing. Therefore, the liquid pressure of the inflow opening 2a can be prevented from rapidly increasing. Then, since the liquid pressure of the inflow opening 2a starts increasing from the low pressure (P1), a pressure increase damping time (t2−t1) until the liquid pressure (relief pressure P) reaches the maximum relief pressure PS by the forward movement of the piston 4 can be extended.

As shown in FIG. 1, according to the relief valve R1, since the elastic force of the first elastic member 5a having the large elastic constant K1 is being utilized, a desired magnitude of the maximum relief pressure PS can be set to the relief valve R1.

Then, when the piston 4 moves forward to contact the step portion 50 of the outer case 1, the piston 4 cannot move downward, that is, forward any more. Therefore, the relief pressure P is maintained at the constant maximum relief pressure PS (state (4) shown in FIG. 2).

Figure 3:
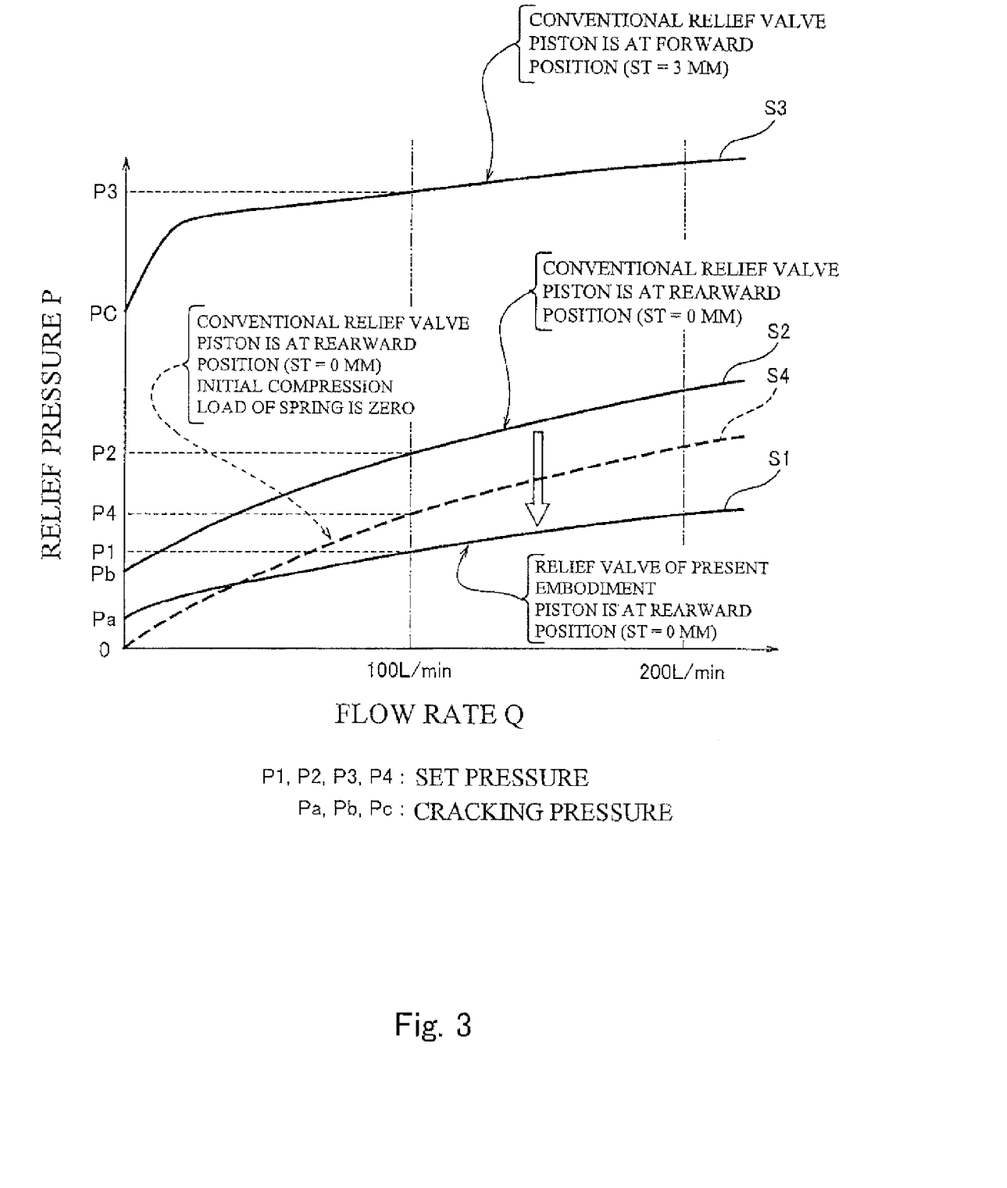
FIG. 3 is a diagram showing an override characteristic of, for example, the relief valve according to Embodiment 1 of the present invention.

At the time of the states (3) and (4) shown in FIG. 2, the pressure liquid of the inflow opening 2a is flowing out through the outflow opening 1a at a substantially constant flow rate (a present device used flow rate of the liquid-pressure circuit, and for example, 100 L/min as shown in FIG. 3).

As above, according to the relief valve R1 shown in FIG. 1, the first and second elastic members 5a and 5b that are different in the elastic constant (K1, K2) from each other are arranged in series. Therefore, in a case where the liquid pressure of the inflow opening 2a rapidly increases, the pressure liquid of the inflow opening 2a can be released to the outflow opening 1a from a state where the liquid pressure of the inflow opening 2a is the comparatively low liquid pressure (P1 shown in FIG. 2).

Figure 4:
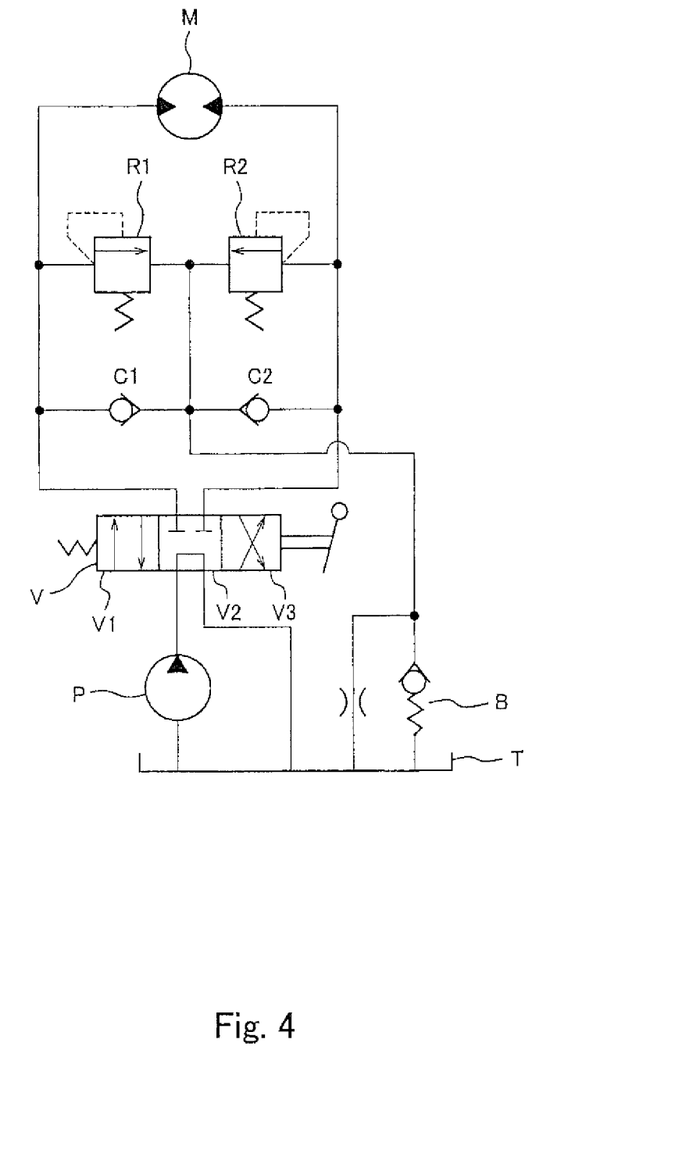
FIG. 4 is a diagram showing a liquid-pressure circuit using the relief valve according to Embodiment 1 of the present invention.

With this, as shown in, for example, FIG. 4, in a case where the relief valve R1 and a relief valve R2 are adopted in a liquid-pressure circuit of a revolving motor M for a revolving super structure of a construction machinery vehicle or the like, the rapid pressure change (torque change) of the liquid-pressure circuit can be prevented from occurring at the time of the start of the speed reduction of the revolving motor M, so that the big impact can be prevented from being applied to the liquid-pressure circuit, the revolving motor M, and the revolving super structure.

In FIG. 4, the relief valves R1 and R2 (the relief valve R2 is the same as the relief valve R1) are respectively connected to a pressure liquid supply port and pressure liquid exhaust port of the revolving motor M. The outflow openings 1a (release sides) of the relief valves R1 and R2 are connected to a liquid tank T through a boost check valve B configured to secure suction pressure of the revolving motor M. It should be noted that "P" denotes a liquid-pressure pump, and "V" denotes a switching valve.

Then, as shown in FIG. 2, since the liquid pressure of the inflow opening 2a can be released to the outflow opening 1a from a state where the liquid pressure of the inflow opening 2a is the comparatively low liquid pressure (P1) (state (3) shown in FIG. 2), the pressure increase damping time (t2−t1) until the relief pressure P of the inflow opening 2a reaches the maximum relief pressure PS can be extended. With this, the revolving motor M can be appropriately, slowly stopped without applying the big impact to the liquid-pressure circuit, the revolving motor M, and the revolving super structure.

The second elastic member 5b having the small elastic constant is adopted to reduce the operation start pressure (initial set pressure P1) of the relief valve, and the first elastic member 5a having the large elastic constant is adopted such that the relief pressure P can be maintained at the predetermined maximum relief pressure PS. With this, the volume of the relief valve can be made smaller than that of a valve configured to act in the same manner as above and using one elastic member having a small elastic constant.

Next, a mechanism of the forward movement of the piston 4 will be explained in reference to FIG. 1. The spring chamber 8 (fifth liquid chamber) communicates with the liquid tank T through the boost check valve B, and the liquid pressure of the spring chamber 8 is a value substantially close to the tank pressure PT. Further, the liquid chamber 52 constituted by the recess 51 of the inner case 54 and the third slide portion 4c of the piston 4 communicates with the tank T through the passage 4e, the spring chamber 8, and the boost check valve B, and the liquid pressure of the liquid chamber 52 is also a value substantially close to the tank pressure PT. Therefore, an effective pressure receiving area of the piston 4 is obtained by subtracting the total of the area of the bottom surface 23 and the area of the rearward acting surface 21 from the area of the forward acting surface 31. The area of the bottom surface 23 is represented by $(d32\times(\pi/4))$=AS, and the area of the rearward acting surface 21 is represented by $((d12-d42)\times(\pi/4))$=AU. In addition, the area of the forward acting surface 31 is represented by $((d12-d22)\times(\pi/4))$=AM. Therefore, an effective pressure receiving area A1 of the piston 4 is represented by the following formula. In the following formula, the pressure of the spring chamber 8 is approximately set to 0.

$$A1=(d42-d32-d22)\times(\pi/4)$$

As above, the piston 4 moves forward by the difference between the forward acting force acting on the forward acting surface 31 (area AM) by the pressure liquid and the rearward acting force acting on the bottom surface 23 (area AS) of the rear space 4d of the slide hole 4f of the piston 4 and the rearward acting surface 21 (area AU) of the piston 4 by the pressure liquid.

As is clear from the above formula, by the setting of the values of d2, d3, and d4, the effective pressure receiving area A1 can be set freely. Therefore, even if the difference between d4 and d4 is increased, the value of A1 can be decreased by increasing the value of d2.

On this account, independently of the thickness of the first slide portion 4a of the piston 4, the effective pressure receiving area A1 for causing the piston 4 to move forward can be set. Thus, the piston 4 having predetermined stiffness can be manufactured.

The area AM of the forward acting surface 31 is larger than the total of the area AS of the bottom surface 23 and the area AU of the rearward acting surface 21, and the difference between the forward acting force and the rearward acting force is generated by this area difference.

Further, the pressure difference between front and rear sides of each of the communication holes 11 and 12 is generated by the difference between the forward acting force and the rearward acting force, and the piston 4 moves forward while the pressure liquid flows through the communication holes 11 and 12.

In this case, by thinly forming the communication holes 11 and 12 or by forming the restrictor 11a at each of the communication holes 11 and 12, the piston 4 slowly moves forward. Thus, the pressure increase damping time (t2-t1) can be extended. By thickly forming the communication holes 11 and 12, the piston 4 quickly moves forward. Thus, the pressure increase damping time (t2-t1) can be shortened. As above, the pressure increase damping time (t2-t1) can be set freely.

Next, a comparison between the override characteristic of the relief valve R1 of the present embodiment shown in FIG. 1 and the override characteristic of a conventional relief valve R10 shown in FIG. 6 will be explained in reference to FIG. 3.

A curved line S1 in FIG. 1 shows the override characteristic when the piston 4 is located at a rearward position (stroke St=0 mm) in the relief valve R1 of the present embodiment shown in FIG. 3. Regarding the curved line S1, cracking pressure is Pa, and the set pressure when the present device used flow rate is, for example, 100 L/mm is P1.

The cracking pressure is the liquid pressure of the inflow opening 2a when the plunger 3 starts opening. The present device used flow rate is a flow rate of pressure liquid used in the revolving motor M. The set pressure is pressure when the plunger 3 is pushed upward by the increase in the pressure of the pressure liquid of the inflow opening 2a, and the flow rate of the pressure liquid flowing through the relief valve R1 becomes the present device used flow rate.

A curved line S2 in FIG. 3 shows the override characteristic when the piston 104 is located at the rearward position (stroke St=0 mm) in the conventional relief valve R10 shown in FIG. 6. Regarding the curved line S2, the cracking pressure is Pb, and the set pressure when the present device used flow rate is 100 L/mm is P2.

Since one spring 105 having the large spring constant is used in the conventional relief valve R10, the set pressure P2 is higher than the set pressure P1 of the relief valve R1 of the present embodiment. Therefore, when stopping the rotation of the revolving motor M, the big impact is applied to the revolving super structure.

A curved line S3 in FIG. 3 shows the override characteristic when the piston 104 is located at a forward position (stroke St=3 mm) in the conventional relief valve R10 shown in FIG. 6. Regarding the curved line S3, the cracking pressure is Pc, and the set pressure when the present device used flow rate is 100 L/mm is P3.

When the piston 104 is located at the forward position as above, the spring 105 is in a compressed state. With this, the set pressure P3 is higher than the set pressure P2 of the curved line S2. Therefore, when stopping the rotation of the revolving motor M, the bigger impact than the case of the curved line S2 is applied to the revolving super structure.

A curved line S4 in FIG. 3 shows the override characteristic when the piston 104 is located at the rearward position (stroke St=0 mm) in the conventional relief valve R10 shown in FIG. 6. Regarding the curved line S4, the spring 105 is provided to have a natural length such that the cracking pressure becomes zero, and the set pressure when the present device used flow rate is 100 L/mm is P4.

Even in a case where the spring 105 is provided to have the natural length such that the cracking pressure becomes 0, the set pressure P4 becomes higher than the set pressure P1 of the curved line S1 of the present embodiment. Therefore, in a case where a spring having a comparatively large spring constant is used, and even if an initial load of pressing the plunger 103 against the valve seat 102 by the spring 105 is set to zero, the bigger impact than the case of the curved line S2 is applied to the revolving super structure when stopping the rotation of the revolving motor M.

Figure 5:
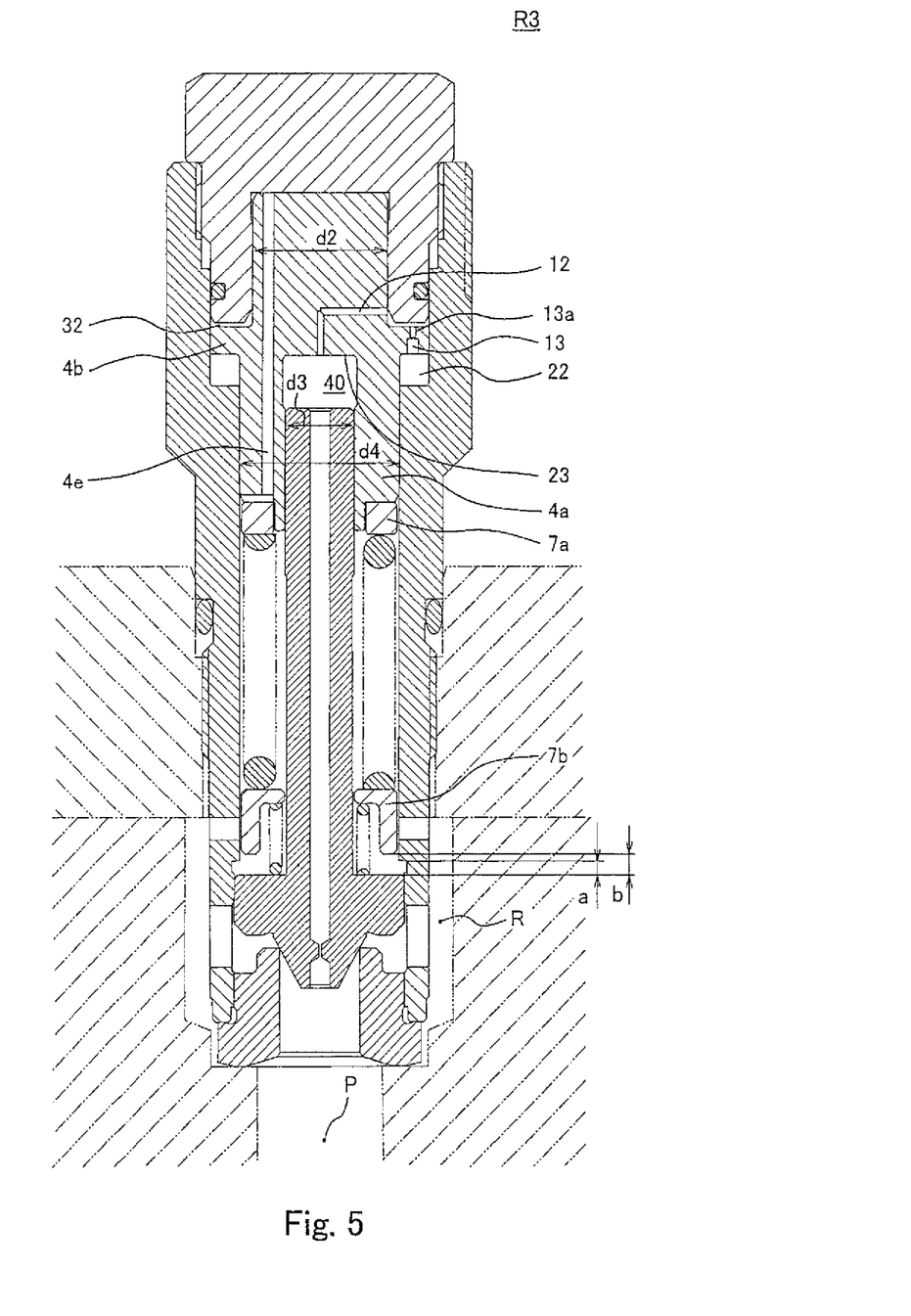
FIG. 5 is a longitudinal sectional view showing a part of the relief valve according to Embodiment 2 of the present invention.

FIG. 5 is a diagram showing Embodiment 2 of the relief valve of the present invention and is a longitudinal sectional view showing the periphery of the piston 4 of a relief valve R2. Unlike the relief valve R1 shown in FIG. 1, the relief valve R3 is configured such that the piston 4 does not include the communication hole 11 that causes the third liquid chamber 40 and the first liquid chamber 22 to communicate with each other but includes a communication hole 13 that causes the first liquid chamber 22 and the second liquid chamber 32 to communicate with each other. To be specific, the first liquid chamber 22 indirectly communicates with the third liquid chamber 40 through the communication hole 12 and the communication hole 13. The communication hole 12 does not include a restrictor, but the communication hole 13 includes a restrictor 13a. The first liquid chamber 22 becomes higher in pressure than the second liquid chamber 32, so that the first liquid chamber 22 can contribute to the adjustment of the pressure increase damping time (t2−t1). Since components other than the above are the same as those of the relief valve R1 shown in FIG. 1, and the behavior of the relief valve R2 is the same as that of the relief valve R1 shown in FIG. 1, explanations thereof are omitted.

Figure 7:
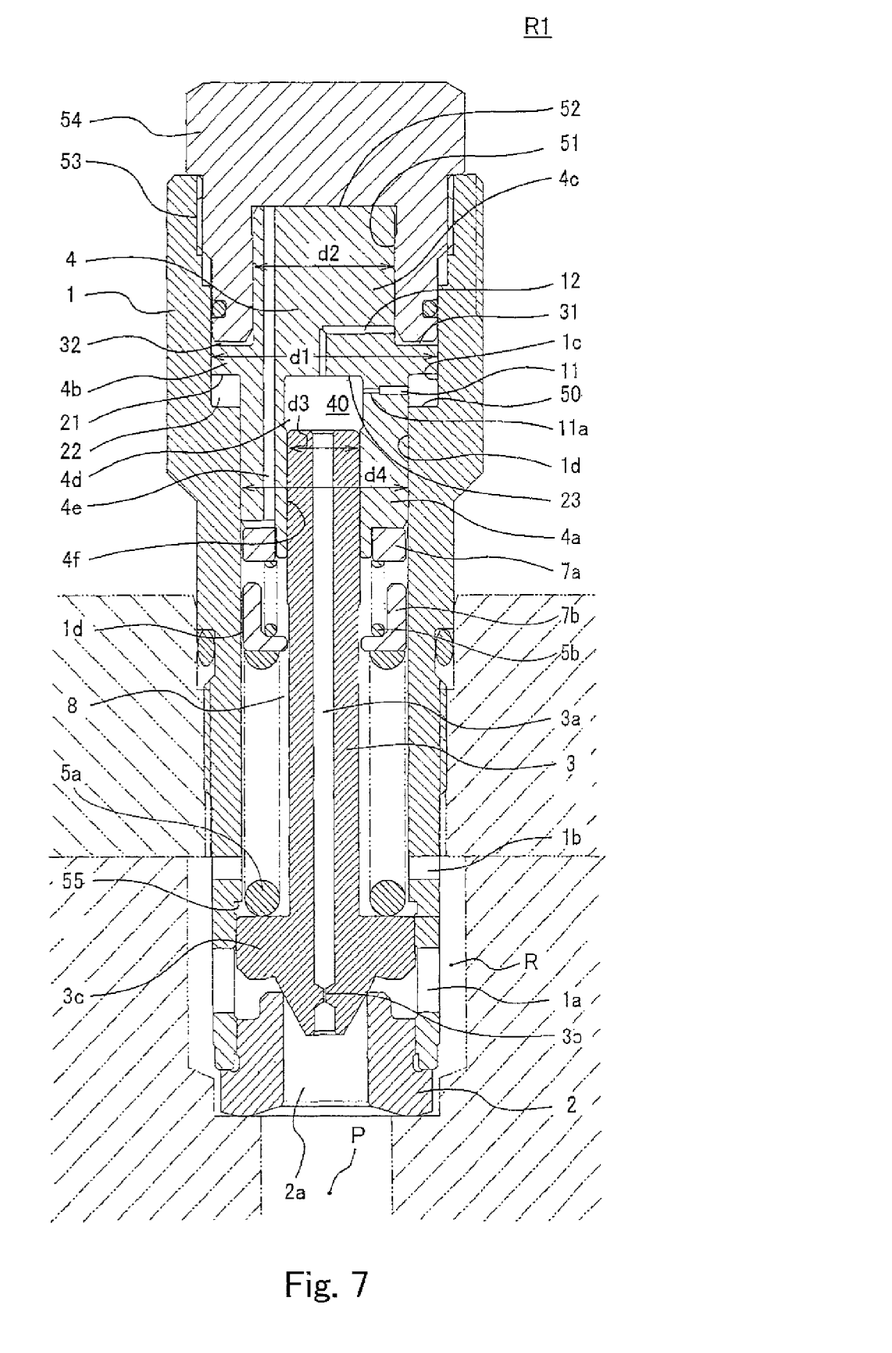
FIG. 7 is a longitudinal sectional view showing a relief valve according to Embodiment 3 of the present invention.

In the above embodiments, as shown in FIG. 1, the first elastic member 5a having the larger elastic constant is arranged at the rear end portion side of the plunger 3, and the second elastic member 5b having the smaller elastic constant is arranged between the first elastic member 5a and the tip end portion side (the valve seat 2 side) of the plunger 3. However, instead of this, as shown in FIG. 7, the positions of the first elastic member 5a and the second elastic member 5b may be reversed. To be specific, the second elastic member 5b having the smaller elastic constant is arranged at the rear end portion side of the plunger 3, and the first elastic member 5a having the larger elastic constant is arranged between the second elastic member 5b and the tip end portion side (the valve seat 2 side) of the plunger 3. Even in this case, the same behavior as the above embodiments is realized. In the case of this configuration, the stopper 55 may be formed at the outer case 1 so as to act in the same manner as the above embodiments.

In the above embodiments, the configurations shown in FIGS. 1 and 5 are adopted, and the piston 4 presses forward the rear ends of the first and second elastic members 5a and 5b, arranged in series, to move forward in accordance with the increase in the pressure of the inflow opening 2a. With this, the relief pressure P is adjusted by compressing the first and second elastic members 5a and 5b. However, the piston 4 may be configured to act in the same manner as the above embodiments while adopting configurations other than the configurations shown in FIGS. 1 and 5.

INDUSTRIAL APPLICABILITY

As above, the relief valve according to the present invention has excellent effects of: in a case where the liquid pressure of the inflow opening rapidly increases, being able to release the pressure liquid of the inflow opening from a state where the liquid pressure is lower than those of conventional cases; being able to prevent the generation of high surge pressure at the inflow opening by starting the increase in the liquid pressure of the inflow opening from a state where the liquid pressure is low as above; and being able to be configured to be small in size. Thus, the present invention is suitably applied to such a relief valve.

REFERENCE SIGNS LIST

R1, R2, R3 relief valve
1 outer case
1a outflow opening
1b passage
1c portion
1d portion
2 valve seat
2a inflow opening
3 plunger
3a through hole
3b restrictor
3c large portion
4 piston
4a first slide portion (medium-diameter portion)
4b second slide portion (large-diameter portion)
4c third slide portion (small-diameter portion)
4d rear space of slide hole
4e passage
4f slide hole of piston
5a first elastic member
5b second elastic member
7a, 7b spring seat
8 spring chamber (fifth liquid chamber)
11, 12, 13 communication hole
11a, 13a restrictor
21 rearward acting surface
22 first liquid chamber
23 bottom surface
31 forward acting surface
32 second liquid chamber
40 third liquid chamber
50 step portion
51 recess (fourth liquid chamber)
52 liquid chamber
53 thread portion
54 inner case
55 stopper

The invention claimed is:

1. A relief valve configured to adjust relief pressure, the relief valve comprising:
a plunger configured to be pushed forward by an elastic unit to block communication between an inflow opening and an outflow opening, the plunger being moved rearward by an increase in pressure of the inflow opening against an elastic force of the elastic unit to cause the inflow opening and the outflow opening to communicate with each other; and
a piston configured to push a rear end of the elastic unit forward, the piston being moved forward by the increase in the pressure of the inflow opening to compress the elastic unit, wherein:
the elastic unit includes
a first elastic member and a second elastic member arranged in series, and
a spring seat inserted around the plunger so as to be interposed between the first elastic member and the second elastic member;
the second elastic member has a smaller elastic constant than the first elastic member and is arranged between the spring seat and one of the plunger and the piston;
said one of the plunger and the piston includes a large portion spreading radially outward;
the plunger is inserted through the spring seat so as to be movable relative to the spring seat;
the spring seat is formed in a cup shape having an opening end portion; and
the opening end portion of the spring seat (i) opposes the large portion, (ii) is located away from the large portion by a predetermined maximum compression length, and (iii) contacts said one of the plunger and the piston to restrict a compression length of the second elastic member such that the compression length of the second elastic member becomes equal to or less than the predetermined maximum compression length.

2. The relief valve according to claim 1, wherein:
a maximum relief pressure is mainly set by the first elastic member; and the relief pressure before the piston moves forward is mainly set by the second elastic member.

3. The relief valve according to claim 1, wherein a stopper configured to stop the rearward movement of the plunger at a predetermined most rearward position is provided at a case in which the plunger is housed.

4. The relief valve according to claim 1, wherein a ratio K1/K2 that is a ratio of an elastic constant K1 of the first elastic member to an elastic constant K2 of the second elastic member is from 5 to 20.

5. The relief valve according to claim 1, wherein:

a liquid chamber in which the elastic unit is housed communicates with the outflow opening;

the piston includes a first slide portion that liquid-tightly slides on an inner hole of a case;

a rear portion of the plunger is slidably, fittingly inserted in a slide hole formed at the piston along a central axis of the piston;

the plunger includes a through hole through which pressure liquid is introduced from the inflow opening to a rear side of the plunger;

a third liquid chamber is formed by the through hole and a space which is located at a rear portion of the slide hole and to which the plunger does not reach;

the piston includes a rearward acting surface and a forward acting surface located at a rear side of the first slide portion;

the third liquid chamber and a first liquid chamber to which the rearward acting surface faces communicate with each other through a communication hole formed at the piston;

the third liquid chamber and a second liquid chamber to which the forward acting surface faces communicate with each other through another communication hole formed at the piston; and the piston moves forward by a difference between a forward acting force applied to the forward acting surface by the pressure liquid and a rearward acting force applied by the pressure liquid to a bottom surface of the slide hole of the piston and the rearward acting surface.

6. The relief valve according to claim 5, wherein:

an area of the forward acting surface is larger than a total of an area of the bottom surface of the slide hole and an area of the rearward acting surface; and the difference between the forward acting force and the rearward acting force is generated by a difference between the area of the forward acting surface and the total of the area of the bottom surface of the slide hole and the area of the rearward acting surface.

7. The relief valve according to claim 5, wherein:

a pressure difference is generated between front and rear sides of each of the communication holes by the difference between the forward acting force and the rearward acting force; and the piston moves forward while the pressure liquid flows through the communication holes.

* * * * *